US005774224A

United States Patent [19]
Kerstens

[11] Patent Number: 5,774,224
[45] Date of Patent: Jun. 30, 1998

[54] LINEAR-SCANNING, OBLIQUE-VIEWING OPTICAL APPARATUS

[75] Inventor: Pieter J. M. Kerstens, Boca Raton, Fla.

[73] Assignee: International Business Machines Corporation, Armonk, N.Y.

[21] Appl. No.: 790,354

[22] Filed: Jan. 24, 1997

[51] Int. Cl.[6] .................................................. G01B 11/00
[52] U.S. Cl. .......................................... 356/394; 356/359
[58] Field of Search .................................... 356/345, 394, 356/351, 359, 360

[56] References Cited

U.S. PATENT DOCUMENTS

| 4,428,676 | 1/1984 | Chastang et al. . |
| 4,583,857 | 4/1986 | Grammerstorff et al. . |
| 4,677,302 | 6/1987 | Chiu et al. . |
| 4,736,110 | 4/1988 | Awamura . |
| 5,162,866 | 11/1992 | Tomiya et al. . |
| 5,666,197 | 9/1997 | Guerra ..................................... 356/359 |

OTHER PUBLICATIONS

"Achromatic Oblique Viewing Microscope," *IBM Tech. Disclosure Bulletin*, vol. 38, No. 02, Feb. 1995, pp. 421–422.

"Method of Automated Visual Inspection of Width and Height of Paste Lines on Ceramic Green Sheets," *IBM Tech. Disclosure Bulletin*, vol. 37, No. 12, Dec. 1994, pp. 593–596.

"Rotational Oblique Viewing Microscope for Pad Analysis Systems," *IBM Tech. Disclosure Bulletin*, vol. 32, No. 8, Jan. 1991, pp. 78–81.

J. C. Chastang, "Oblique Viewing Attachment for Microscope," *Proceedings of SPIE*, vol. 399, 1983, pp. 239–245.

*Primary Examiner*—Frank G. Font
*Assistant Examiner*—Robert Kim
*Attorney, Agent, or Firm*—Richard A. Tomlin; Ronald V. Davidge

[57] ABSTRACT

Microscopic apparatus for inspecting electronic circuit chips includes an illumination source directing light at a chip at an oblique angle with respect to a normal plane perpendicular to its surface. To take advantage of specular reflection, a lens is arranged to view the chip also at an oblique angle, placing an image of a strip of the circuit chip on a linear CCD. Movement of the circuit chip in a scanning direction causes the image to flow across the circuit chip in a transverse direction, allowing a two-dimensional data pattern to be formed with data from successive operations reading data from the CCD.

10 Claims, 3 Drawing Sheets

LINEAR-SCANNING, OBLIQUE-VIEWING OPTICAL APPARATUS

BACKGROUND OF THE INVENTION

1. Field of the Invention

This invention relates to apparatus for generating data in response to a light pattern viewed at an oblique angle, and, more particularly, to such apparatus as applied to determine the height of microscopic surface features.

2. Background Information

One type of conventional optical system viewing an essentially flat subject at a first oblique angle to a plane extending perpendicularly from the subject plane forms an image of the subject along a plane extending perpendicularly to a second oblique angle to the optical axis of the lens. In photography, this phenomenon, which is usually called "the Scheimpflug principle," is often used to produce images having both accurate focus and exaggerated perspective, with planes through the lens and film holder having a common intersection line with the object plane. However, when microscopic techniques are used to inspect electronic circuits, the distortion caused by the apparent perspective of viewing the subject at an oblique angle is particularly disadvantageous. Furthermore, the application of the Scheimpflug principle by holding the photoreceptive surface at an oblique angle makes relatively large oblique angles of view impractical because of the high angle at which the photoreceptive surfaces must be held.

Two types of inspection devices are used to determine the heights of small surface features on sample parts being inspected. The first of these types is the oblique viewing microscope, in which the sample is illuminated and viewed from oblique angles at opposite sides of a plane normal to the surface of the sample. Conventionally, both the illumination and viewing angles are 45-degrees from this normal plane. The height of an individual surface feature is determined by measuring the length a darkened area extending along the surface of the sample.

The second type of inspection device provides height sensing through triangulation. Either the illumination is provided at an oblique angle while the surface of the sample is viewed along an optical axis perpendicular to the surface of the sample, or the illumination is provided along an angle perpendicular to the surface of the sample while the sample is viewed along an oblique angle. Depending on the type of inspection being done, the illumination is either a narrow spot or a narrow sheet of light. The reflection of the illuminated spot or line is offset from the optical axis along which it is viewed according to the height of the surface being illuminated.

A significant use for oblique viewing and surface feature height determination occurs during the manufacture of integrated circuits in which the solder reflow joining technology is used to join chips to substrates. In this process, solder mounds are evaporated on via holes to form electrical connections. There may be more than 100 such mounds on a single chip. To insure proper joining of the chip to the substrate, each mound must meet minimum and maximum criteria for height and volume.

DESCRIPTION OF THE PRIOR ART

U.S. Pat. No. 4,428,676, describes an oblique viewing microscope requiring a complex optical configuration including an afocal 1x relay lens and a diffraction grating to form a two-dimensional, in-focus oblique view. Illumination from a light source is directed at a sample surface, and is reflected from this surface to travel through an imaging system with a unity magnification, including the relay lens, to a diffraction grating. The image reflected from the diffraction grating is transmitted through a secondary imaging system to a photosensitive surface, such as a two-dimensional CCD (charge-coupled device) array generating electronic signals. Usually, the system is designed with a resolution that is many times larger than the selected wavelength of operation and pitch of the diffraction grating.

Because the diffraction grating is placed in the optical path, these systems require a narrow light spectrum and a closely held angle at which light is projected to the diffraction grating to work properly. Furthermore, the speed at which the measuring system can be used is determined by the time required to expose the CCD array properly. Since this time is in turn determined by the available level of illumination placed on the object being viewed, the system must either operate slowly, or a light source having a high output in a particular spectral band must be applied.

The limitations of this system result from the fact that an object plane lying at an oblique angle to the optical axis of the afocal 1x relay lens is projected to a tilted intermediate image plane coincident with the diffraction grating, which is in turn viewed normally by a secondary imaging system. The diffraction grating acts as a screen capable of reflecting light in multiple directions without superimposing microscopic artifacts. The system is normally designed to operate at a specific wavelength with one of its lower-order principle maxima reflecting normally off the intermediate image plane. Increasing the field of view requires the use of a larger diffraction grating, which must be clean and free of defects, and which is therefor more expensive.

Furthermore, the system of U.S. Pat. No. 4,428,676, uses a two-dimensional imaging surface, such as a CCD array, to acquire a two-dimensional array of image points or pixels. Objects that are larger than the field of view must be stepped through the imaging field, so that time is wasted in accelerating, moving, and decelerating the sample being inspected.

In the *IBM Technical Disclosure Bulletin*, Vol. 38, No. 02, February, 1995, pp. 421–422, an article entitled "Achromatic Oblique Viewing Microscope" describes a method for improving the range of illumination spectra and viewing angles which can be used within an oblique viewing microscope. The afocal relay lens of U.S. Pat. No. 4,428,676 is replaced with an Offner lens, which is particularly described in U.S. Pat. No. 3,748,015. The image of the object being viewed is directed to the diffraction grating after a first reflection off a relatively large primary cylindrical mirror, a reflection off a smaller secondary cylindrical mirror coaxial with the primary cylindrical mirror, and a second reflection off the primary cylindrical mirror. The longer optical path between the sample and the diffraction grating improves the ability of the system to work properly despite variations in the illumination spectral frequency and in the oblique viewing angle. However, there is a continued need to satisfy the conditions of the diffraction grating equation, so the variations in spectral frequency and in the angle at which light is projected onto the diffraction grating must still be limited.

In the *IBM Technical Disclosure Bulletin*, Vol. 37, No. 12, December 1994, pp. 593–596, an article entitled "Method of Automated Visual Inspection of Width and Height of Paste Lines on Ceramic Green Sheets," describes a non-contact automated inspection method using an oblique-viewing microscope for verifying the uniformity of paste lines on ceramic green sheets. While this article describes a particular application of a conventional oblique angle viewing microscope, it does not address the problems of requiring a narrow, fixed spectral illumination frequency and a fixed oblique angle for projecting light onto the diffraction grating.

In the *IBM Technical Disclosure Bulletin*, Vol. 33, No. 8, January 1991, pp. 79–81, an article entitled "Rotational Oblique Viewing Microscope for Pad Analysis Systems," describes an oblique angle viewing microscope system in which the angle of illumination is varied from a conventional level of 45 degrees to allow a full shadow of a surface feature to be viewed without interference from an adjacent surface feature. However, this article also does not address the problems listed above.

What is needed is an oblique-viewing microscope in which the illumination spectrum can be easily changed, and in which broader-spectrum light sources can be used. Such a microscope would permit the use of a wide variety of light sources having illumination levels providing fast integration times. Also, the illumination spectrum of such a device could be varied in wavelength and spectral width to optimize the viewing and inspection of a particular type of object by, for example, increasing the contrast between the background viewed and the particular features to be inspected.

What is also needed is a microscope system in which angles of illumination and viewing both the oblique angle of the illumination system and the oblique angle of the viewing system can be easily changed to enhance the image formation process. What is also needed is a microscope system in which a sample is inspected while moving at a constant scanning speed, so that time is not wasted accelerating, moving, and decelerating the sample, and waiting for the vibration caused by such movements to settle out.

A number of U.S. Patents describe devices performing height sensing by triangulation. Examples of such devices are described in U.S. Pat. Nos. 5,162,866, 4,677,302, and 4,583,857. However, devices of this type suffer particularly with inaccuracies resulting from the fact that changes in the angular orientation of the illuminated portion of the surface of the sample, as well as in its elevation, cause the deflection of the point or line where the illuminated beam strikes the photosensitive device measuring its location. Furthermore, additional sensor and processor complexity is necessary to perform the triangulation process. Again, what is needed is an oblique viewing microscope without the particular disadvantages described above.

SUMMARY OF THE INVENTION

In accordance with one aspect of the invention, there is provided apparatus for generating data representing an illumination pattern formed along a surface of a test specimen. The apparatus includes a photosensitive transducer, an objective lens, and a specimen drive mechanism. The photosensitive transducer produces an output signal in response to a light pattern striking its photosensitive surface, with a single signal value being produced in response to an illumination pattern extending in a transverse direction along its photosensitive surface. The objective lens has an optical axis extending at an oblique angle from a normal plane perpendicular to the surface to the test specimen in a viewing region of the apparatus. The objective lens produces an image of the surface of the test specimen on the photosensitive surface, with movement of the specimen in a scanning direction causing the image to flow along the photosensitive surface in the transverse direction. The specimen drive means moves the test specimen at a constant velocity past the viewing region of the apparatus, with a component of the motion of the test specimen occurring in the scanning direction.

In accordance with another aspect of the invention, there is provided an illumination mechanism illuminating the surface of said test specimen at an oblique illumination angle from the normal plane, with the oblique viewing angle and the oblique illumination angle extending from opposite sides of the normal plane.

BRIEF DESCRIPTION OF THE DRAWINGS

FIG. 3 is a fragmentary cross-sectional view of the circuit chip of FIG. 2, showing a solder mound under illumination within the viewing microscope;

FIG. 4 is a fragmentary plan view of the circuit chip of FIG. 3, showing an elongated darkened area extending adjacent the solder mound;

DETAILED DESCRIPTION

Figure 1:
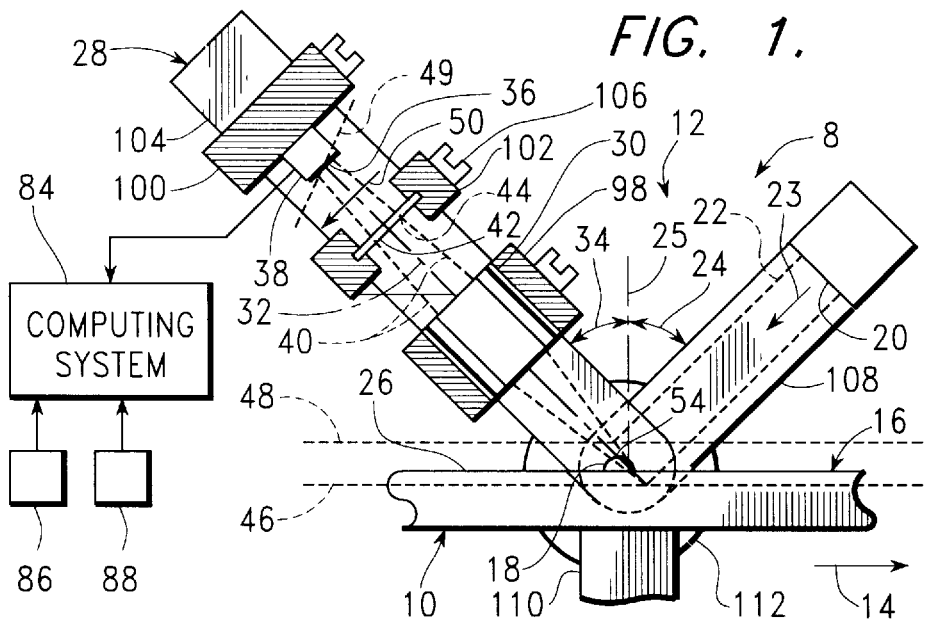
FIG. 1 is a partially sectional side elevation of a linear scanning, oblique viewing microscope built in accordance with the present invention.

FIG. 1 is a schematic side elevation of a linear scanning, oblique viewing microscope, generally indicated as 8, built in accordance with the present invention. In this device, a test specimen, generally indicated as 10, is driven past a viewing region 12 at a constant velocity motion having at least a component of motion occurring in the scanning direction indicated by arrow 14. The upper surface 16 of test specimen 10 typically includes a number of outward extending protrusions 18, the size of which is to be determined by examination with the linear-scanning, oblique-viewing microscope 8. An illumination source 20 projects a beam of light 22 onto the upper surface 16. The illumination source 20 is configured so that this beam 22 is directed in the direction of arrow 23, at a first oblique angle 24 with respect to a plane 25 extending perpendicularly to the flat portions 26 of the surface 16. The microscope 8 also includes a viewing portion, generally indicated as 28, having an objective lens 30 with an optical axis 32 directed at the specimen surface 16 within viewing region 12 at a second oblique angle 34 relative to the perpendicular plane 25. A portion of the light from beam 22 is reflected from specimen surface 16 through objective lens 30 to be focussed along a photoreceptive surface 36 of a photoreceptive device 38.

The width imaged on photoreceptive surface 36 is much narrower than the width of illumination beam 22. The width through which light rays are accepted by the photoreceptive surface 36, which is indicated by dashed lines 40, is determined by the width of the photoreceptive surface 36 or by an optional aperture plate 42 having an opening 44 allowing the passage of light between the objective lens 30 and the photoreceptive surface 36.

The illumination beam 22 is preferably wide enough to illuminate the entire portion of specimen surface 16 which can reflect light rays onto the photoreceptive surface 36. Thus, the illumination beam 22 preferably extends, as shown, at least between the intersections of dashed lines 40 with a dashed line 46 representing the lowest level at which a portion of specimen surface 16 is expected to lie, and with a dashed line 48 representing the highest level at which a portion of specimen surface 16 is expected to lie.

Since the specimen surface 16 is viewed at an oblique angle 34, the image of this surface is formed along a plane 49 inclined at an angle from the photoreceptive surface 36. The value of this angle also depends on the inclination of the portion of the surface 16 being projected through objective lens 30. However, conditions of acceptable focus are maintained, since the area through which light rays are accepted by photoreceptive surface 36 is narrow enough in the transverse direction of arrow 50, as indicated by dashed lines 40, to limit the offset of each portion of the photoreceptive surface 36 from the plane 49, so that acceptable focus of the image is achieved along the surface 36. The consequential narrowness of the imaged portion 54 of specimen surface 16 in the scanning direction of arrow 14 furthermore prevents a form of optical distortion, generally known as "keystoning," which otherwise typically occurs when a surface of substantial width is imaged at an oblique angle.

In a preferred version of the present invention, the photoreceptive surface 36 and the illumination source 20 extend through a relatively long distance in a longitudinal direction perpendicular to the transverse direction of arrow 50, allowing a relatively wide path along the specimen surface 16 to be imaged during a single movement of the test specimen 10. For example, the photoreceptive device 38 may be a linear CCD (charge coupled device) having 1024 or 2048 elements arranged in a single, longitudinally-extending row to form the photoreceptive surface 36. While such a device can image only a one-dimensional view of the illuminated portion of specimen surface 16, the test specimen 10 is preferably driven so that its movement in the scanning direction of arrow 14 is synchronized with the reading and storage of data from the photoreceptive device 38, allowing the capture of data forming a two-dimensional, obliquely-viewed image of the surface 16. During this process, movement of the specimen surface 16 in the scanning direction of arrow 14 causes the image of this surface 16 to flow along the photoreceptive device 38 in the transverse direction of arrow 50.

Figure 2:
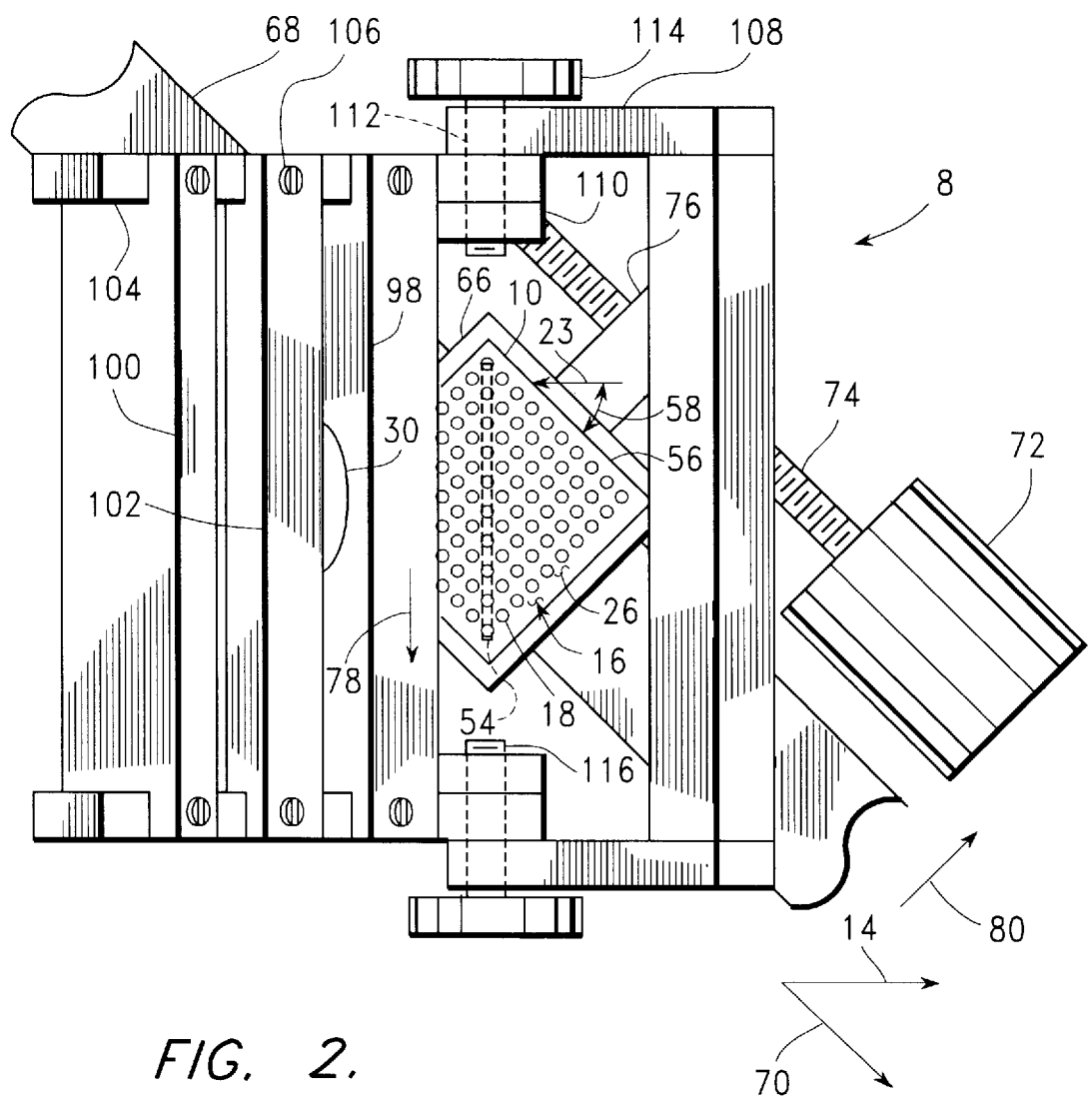
FIG. 2 is a plan view of the microscope of FIG. 1, as used in a first version of an inspection process for quantitatively determining the volume of solder mounds present on a circuit chip within an integrated circuit manufacturing process.

FIG. 2 is a plan view of the oblique-viewing microscope 8, showing its use in a first version of an inspection process for quantitatively determining the volume of solder mounds present in an integrated circuit manufacturing process. In the example of FIG. 2, test specimen 10 is an integrated circuit chip having an upper surface 16 including a number of solder mounds 18 placed by a previous manufacturing process. In a subsequent process, the solder mounds 18 are reflowed to form various electrical connections with circuit traces extending along a substrate (not shown). For this reflow process to occur properly and reliability, the volume and height of each mound 18 must be held within relatively tight limits.

The solder mounds 18 are typically placed on some or all of the points on a grid formed by lines lying parallel and perpendicular to a side 56 of the circuit chip 10. Since the process of determining the height and volume of a solder mound 18 depends on viewing the shadow cast by the mound on its own side and on a surrounding flat portion 26 of the specimen surface, it is advantageous to direct the illumination occurring in the direction of arrow 23 at an angle 58 maximizing the distance through which such a shadow can be projected and viewed without interference from adjacent mounds 18. If the mounds 18 are equally spaced in both directions along a rectangular grid, this angle is 45 degrees, with the center-to-center distance between adjacent mounds along a line at this angle being 41 percent greater than the center-to-center distance between adjacent mounds along a grid line.

FIG. 3 is a fragmentary cross-sectional view of the specimen 10, showing particularly the reflection of a number of light rays directed from the illumination source 20 (shown in FIG. 1) in the direction of arrow 23 at a solder mound 18 and at the surrounding flat surface 26.

Referring to FIGS. 1 and 3, since the surfaces of solder mound 18 are specular, a light ray is simply reflected at an angle of reflection equal to its angle of incidence, with minimal light scattering. A lowermost light ray 59 of this example strikes the surface of flat 26, reflecting upward adjacently past the solder mound 18. An uppermost light ray 60 of this example is projected adjacently past the solder mound 18 to reflect off the flat surface 26. The reflections of both these light rays 59, 60 are directed through the objective lens 30 to the photoreceptive surface 36. Light rays extending in the direction of arrow 23 between the rays 59, 60 are not reflected to travel through the objective lens 30. For example, light rays 61 are reflected off the solder mound 18 in various directions extending away from the objective lens. A light ray 62 close to the lowermost light ray 59, reflected off the flat surface 26, is blocked by the interposition of solder mound 18 from entering the lens 30, being instead reflected to return toward the illumination source 20.

FIG. 4 is a fragmentary plan view of the specimen 10, showing particularly the darkened areas around the solder mound 18, as seen by the photosensitive surface 36 through the objective lens 30 (both shown in FIG. 1) resulting from the reflection of light rays as described above in reference to FIG. 3.

Continuing to refer to FIGS. 1 and 3, and referring additionally to FIG. 4, a surrounding area 63 of flat surface 26 appears at photosensitive surface 36 as being illuminated, since light rays, such as rays 59, 60 reflect off this surface 26 without interference from the solder mound 18. A portion 63a of the flat surface 26 and a portion 63b of the solder mound are darkened by being in a shadow of the solder mound 18, so that they are not reached by light rays such as rays 61. The remaining portion 63c of the solder mound 18 is illuminated by the illumination source 20 (shown in FIG. 1), through these rays 61, but, since these rays 61 are reflected away from the objective lens 30, this portion 63c of the solder mound 18 appears darkened when viewed by the photosensitive surface 36. A remaining portion 63d of the flat surface 26 is also illuminated by the illumination source 20, but this surface 63d appears darkened to the photosensitive surface 36, since the reflections of light rays, such as light ray 62, from this surface are directed away from the lens 30 by a subsequent additional reflection off the solder bump 18.

Thus, the photosensitive surface 36 views each solder mound 18 as an extended darkened area 64 comprised of the darkened surfaces 63a, 63b and the surfaces 63c, 63d which are illuminated, but which do not reflect illumination through the objective lens 20 into the photosensitive surface 36. The extent of the darkened area 64 can be used in a number of ways to determine the height and volume of the solder mound. For example, the height of the solder mound 18 is derived by measuring the length of a first central line 65 extending along the darkened area 64 in the scan direction of arrow 14. The width of the solder mound 18 is derived by measuring the length of a second central line 65a extending along the darkened area 64 perpendicularly to the scan direction of arrow 14. In one version of this method, the location at which each solder mound 18 is supposed to be centered is known, so that data points corresponding to a particular line in alignment with this center are checked to determine the length of the darkened area 64, as indicated by arrow 65 and the width of the darkened area 64, as indicated by arrow 65a. In another version of this method, a pattern recognition algorithm is used to determine the size and shape of the darkened area 64 wherever a significant darkened area is detected.

Referring again to FIG. 2, the specimen 10, held in a specimen carrier 66, which is slidably mounted to move along a rail 68, is driven in the direction of arrow 70 by a constant-speed drive mechanism, such as a drive motor 72, which turns a leadscrew 74 in engagement with a downward extending portion 76 of the specimen carrier 66. In this example, the area 54, which is simultaneously imaged on the illumination sensitive surface 36 (shown in FIG. 1) is long enough, in the direction of arrow 78, to allow the entire specimen surface 16 to be imaged in a single movement of the specimen 10 in the direction of arrow 70. If the specimen surface 16 is too large to allow such single-pass imaging, the rail 68, drive motor 72, and specimen 10 may be moved in and opposite to the direction of arrow 70 several times, with incremental movements occurring in a direction of arrow 80 between the movements in and opposite the direction of arrow 70. With this kind of multi-pass imaging, the imaging process may occur both during movements in the direction of arrow 70 and during movements opposite this direction, or movement in one of these directions may be used simply to index the part into a position from which another imaging scan can occur.

Referring again to FIG. 1, the output of CCD unit 38 is provided as an input to a computing system 84, in which a program for comparing this output with various pass/fail criteria is executing. This program has been loaded into the computing system 84 by means of a diskette 86. Another diskette 88 is used to load data particularly relevant to the type of specimen being inspected, such as the locations where solder mounds are supposed to be placed and the pass/fail criteria. The program operating in computing system 84 also causes data indicating the results of this inspection process for each specimen 10 to be stored. Material handling apparatus (not shown) may also be operated in response to an output from computing system 84, so that parts failing the inspection process are physically separated from parts passing the process.

Figure 5:
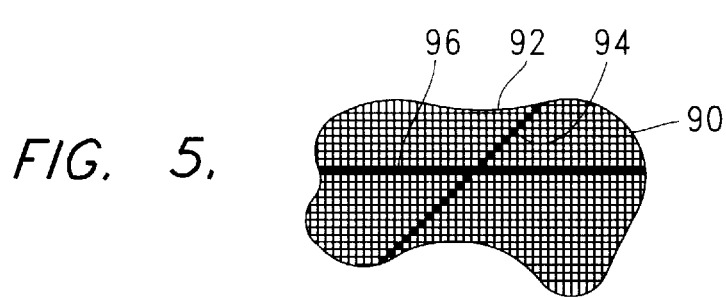
FIG. 5 is a fragmentary graphical representation of data from the output of a linear CCD unit within the microscope of FIG. 1.

FIG. 5 is a fragmentary graphical representation of data from the output of the linear CCD unit 38. Each row 90 represents the data sequentially read from the unit following a single exposure to light reflected from the specimen surface 16. Within each row 90, each space 92 represents data derived from a single element of the linear CCD unit 38. This type of small unit of data is often called a "pixel" for "picture element."

Referring to FIGS. 2–5, the speed at which the specimen 10 is driven in the direction of arrow 70 is preferably adjusted so that when one portion of the specimen surface 16 has been imaged within area 54, with the data corresponding to this area being read as the output of the CCD device 38, the next portion of the specimen surface 16 is imaged. Overlaps between adjacent rows of pixels, or gaps between them, are at most minimal, with such overlaps or gaps being inconsequential, since they are small compared to the size a darkened area 64, which must include a number of pixels. Since the specimen is moved at angle 58 with respect to the direction in which the darkened areas 64 are formed, the line indicated by arrow 65, the darkened portion of which is most conveniently used to determine the height of an individual solder mound 18, moves in the direction of arrow 78 along the image area 54. In the example of FIGS. 2 and 4, the angle 58 is 45 degrees, and the individual pixels are square, so the line indicated by arrow 65 is imaged as a number of pixels 94 which are diagonally adjacent in the data representation of FIG. 4. Thus, this type of line is examined by determining the values of diagonally adjacent pixels 94, shown as darkened. In other words, in a sequential data scan from the linear CCD device 38, this line is examined as a pixel occurring just before a corresponding pixel in a previous data scan is examined.

On the other hand, the line indicated by arrow 65a, the darkened portion of which is most conveniently used to determine the width of an individual solder mound 18, is simultaneously imaged by the various elements of the linear CCD device 38. Thus, as indicated by the darkened line of pixels 96 on FIG. 5, simultaneously imaged pixels are examined to determine the width of the darkened area.

The physical characteristics of the oblique viewing and scanning microscope 8 can be configured or adjusted to optimize performance under a number of conditions and applications. In the application described above in reference to FIG. 2, a CCD device 38 having square individual photoreceptive elements with each side having a length of 10 microns is preferably used, with the objective lens being configured and adjusted to provide a magnification of 1.5 times between the surface viewed in area 54 and the image formed on the photoreceptive surface 36. Thus, each individual photoreceptive element views a square section of the specimen surface 16 having a side with a length of about 6.7 microns.

Continuing to refer to FIG. 2, and referring again to FIG. 1, the oblique viewing and scanning microscope 8 has a number of advantages, particularly when compared to the device of U.S. Pat. No. 4,428,676, related to the ease with which a microscope built in accordance with the present invention can be adjusted and reconfigured. This facility for change is readily used to configure the microscope 8 in a manner optimizing its use with a particular type of specimen 10. For example, since the present invention uses an objective lens 30 of a conventional optical type (i.e. because the 1× afocal lens of U.S. Pat. No. 4,428,676 is not required), the magnification of the microscope of the present invention can be readily changed by moving the objective lens and the photosensitive device 38. This type of movement is accommodated by mounting the objective lens 30 on a first support bar 98, by mounting the photosensitive device 38 on a second support bar 100, and by mounting the aperture plate 42, if it is used, on a third support bar 102, with the three support bars 98, 100, 102 being slidably mounted at each end on a optics mounting rail 104. After adjustment as needed, each of these support bars 98, 100, 102 is individually clamped using a pair of clamping screws 106.

The illumination source 20 is mounted on a pair of illumination support bars 108. Both the optics mounting rails 104 and the illumination support bars 108 are pivotally mounted on a stationary frame 110 by a pair of mounting screws 112 extending outward from the frame 110. Each screw 112 includes a clamping wheel 114, and a threaded ends 116 engaging the frame 110. This method of mounting the various optical components provides an easy method for changing the oblique angle 34 of the optical elements mounted on the rails 104 and the oblique angle 24 of the illumination source 20. Normally, both of these angles 24, 34 are set equal to 45 degrees. To maximize reception of the light reflected from the flat portion 24 of specimen surface 16, these angles 24, 34 are usually set equal to one another. However, a specimen having relatively low solder mounds 18, spaced relatively far apart, is most effectively viewed when illuminated at an angle 24 significantly more than 45 degrees, to increase the sensitivity of the inspection process by lengthening the resulting darkened areas 64 (shown in FIG. 3). If the solder mounds 18 on a specimen surface 16 are particularly close together, it is necessary to decrease both the angles 24, 34 to prevent interference between the shadow of an individual solder mound and adjacent solder mounds. In general, variations in the angles 24, 34 may be used to enhance the ability of the microscope 8 to detect variations in specimen features of particular interest.

Furthermore, in the present invention, various types of devices may be used as illumination source 20. There is no need to provide monochromatic illumination as in the device of U.S. Pat. No. 4,428,676. In the present invention, collimation of light from the illumination source 20 is desirable to make the edges of the darkened areas 64 more distinct.

Figure 6:
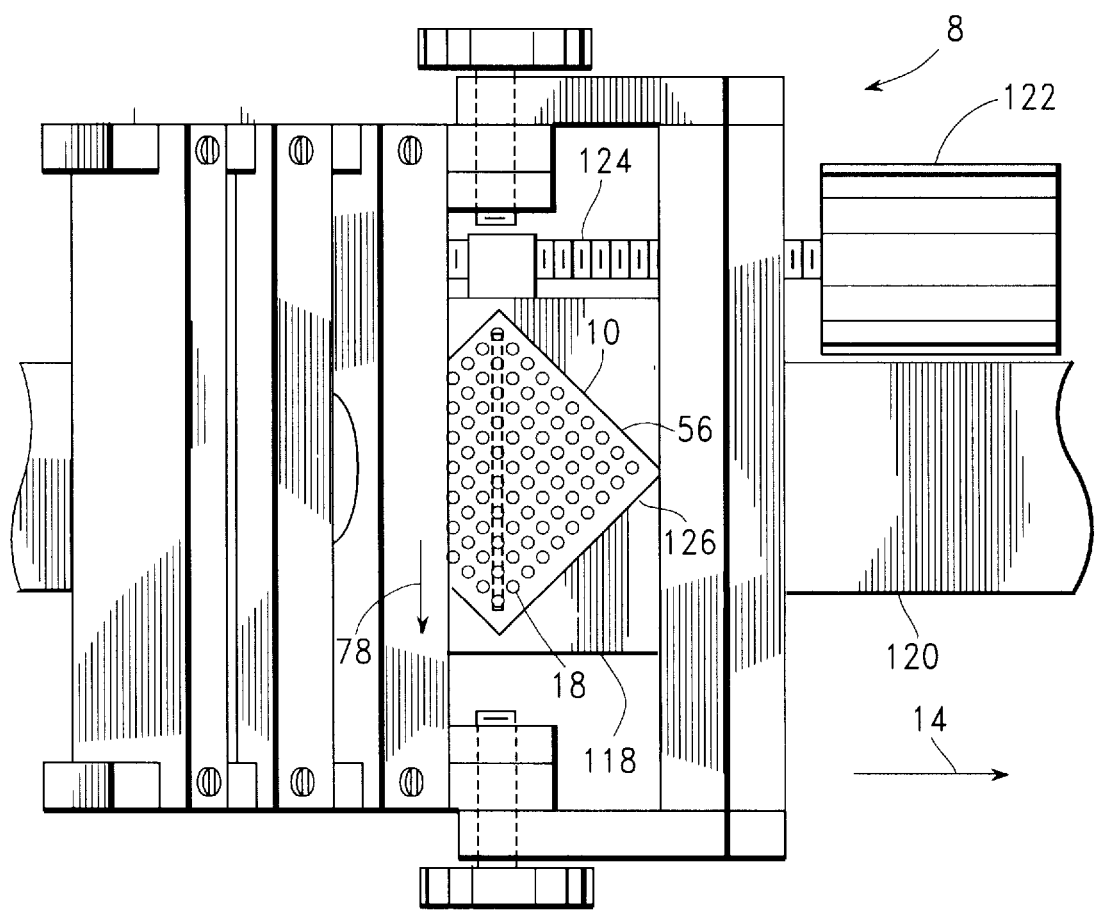
FIG. 6 is a plan view of the microscope of FIG. 1, as used in a first version of an inspection process for quantitatively determining the volume of solder mounds present on a circuit chip within an integrated circuit manufacturing process.

FIG. 6 is a plan view of the oblique-viewing microscope 8, showing its use in a second version of an inspection process for quantitatively determining the volume of solder mounds present in an integrated circuit manufacturing process. In this version, the angular orientation of the specimen 10, as previously described in reference to FIG. 2, is retained, but the direction of motion of the specimen through the inspection apparatus is changed to be parallel to the scanning direction of arrow 14. To accomplish such movement, the specimen 10 is placed in a specimen holder 118, which is driven along a rail 120 by a motor 122 turning a leadscrew 124. Other features of the apparatus of FIG. 6 are as previously described in reference to FIGS. 1 and 2.

Continuing to refer to FIG. 6, the coordinates of the desired locations of the various solder mounds 18 on the upper surface 16 of the sample 10 are typically given as a function of distances from a pair of edges 56, 126 of the sample 10. A well-known technique for coordinate transformation is used to rotate these coordinates into a system of coordinates extending in the scanning direction of arrow 14 and in the direction perpendicular thereto, as indicated by arrow 78.

Referring additionally to FIG. 4, in the example of FIG. 6, the line indicated by arrow 65, the darkened portion of which is most conveniently used to determine the height of an individual solder mound 18, does not move in the direction of arrow 78. Thus, the length of a darkened portion of this line indicated by arrow 65 is easily determined by examining the intensity values of pixels resulting from light striking an individual element of the linear CCD array 38 (shown in FIG. 1.), with this individual element being in alignment with the center of the solder mound 18. As before, the length of the darkened portion of the line indicated by arrow 65a, which is most conveniently used to determine width of the individual solder mound 18, is determined by evaluating the intensity levels achieved as various elements of the linear CCD array 38 are simultaneously illuminated in line with the passage thereby of an image of the center of the solder mound 18.

Referring again to FIG. 1, in an alternative version of the present invention, the photoreceptive device 36 is a small "point" detector, while the illumination source 20 projects a spot of light. In this case, motion between the specimen and the microscope 8 having a component perpendicular to the scanning direction must be used to generate a two-dimensional array of data points.

In all cases, movement of the microscope elements for illumination and imaging, with the specimen being held stationary, can be substituted for movement of the specimen.

While the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention.

What is claimed is:

1. Apparatus for determining physical characteristics of a surface of a test specimen, wherein said surface includes a plurality of outward extending protrusions, and wherein said apparatus comprises:

a photosensitive transducer producing an output signal in response to a light pattern striking a photosensitive surface thereof, wherein a single signal value is produced in response to an illumination pattern extending in a transverse direction along said photosensitive surface;

an objective lens having an optical axis extending at an oblique viewing angle from a normal plane perpendicular to said surface of a test specimen in a viewing region of said apparatus, wherein said objective lens produces an image of said surface of a test specimen on said photosensitive surface, with movement of said test specimen in a scanning direction causing said image to flow along said photosensitive surface in said transverse direction;

specimen drive means moving said test specimen at a constant velocity past said viewing region of said apparatus, with a component of motion of said test specimen occurring in said scanning direction; and illumination means illuminating said surface of said surface of said test specimen at an oblique illumination angle from said normal plane, with said oblique viewing angle and said oblique illumination angle extending from opposite sides of said normal plane wherein data is read from said charge coupled device in read operations, each of which provides data corresponding to a single illumination pattern extending along said charge coupled device in said longitudinal direction, and wherein, due to movement of said flowing image in said transverse direction, data from sequentially occurring read operations are derived from patterns of illumination reflected off portions of said surface of said test specimen adjacently disposed in said scanning direction, wherein an extent of a darkened region on said surface of a test specimen is determined by examining output data from said charge coupled device to determine lengths of said darkened region along first and second lines perpendicular to one another, wherein said length of said darkened region extending along said first line is determined by examining data from said photosensitive elements adjacent one another in said longitudinal direction in said sequentially occurring read operations; and wherein said length of said darkened region extending along said second line is determined by examining data from an individual read operation among said sequentially occurring read operations.

2. The apparatus of claim 1, wherein said illumination means entirely illuminates a side of a protrusion within said plurality thereof.

3. The apparatus of claim 1:

wherein said photosensitive elements are square; and wherein said test specimen is moved in a specimen drive direction at a 45-degree angle from said scan direction.

4. The apparatus of claim 1:

wherein said specimen drive means moves said test specimen in said scanning direction;

wherein an extent of a darkened region on said surface of a test specimen is determined by examining output data from said charge coupled device to determine lengths of said darkened region along first and second lines perpendicular to one another;

wherein said length of said darkened region extending along said first line is determined by examining data from an individual member of said photosensitive elements in said sequentially occurring read operations; and wherein said length of said darkened region extending along said second line is determined by examining data from an individual read operation among said sequentially occurring read operations.

5. The apparatus of claim 1, additionally comprising a computing system, provided with an input signal from said charge coupled device, in which a computer program is executing for determining characteristics of darkened portions of said flowing image, for performing comparisons of said characteristics with stored criteria, and for storing results of said comparisons.

6. The apparatus of claim 1, wherein said photosensitive surface is perpendicular to said optical axis of said objective lens.

7. The apparatus of claim 1, wherein said photosensitive transducer and said objective lens are mounted on a first support member, with said first support member being mounted to pivot adjacent said viewing region.

8. The apparatus of claim 7, wherein said photosensitive transducer and said objective lens are slidably mounted to move on said first support member toward said pin.

9. The apparatus of claim 7, wherein said illumination means is mounted on a second support member, with said second support member being additionally mounted to pivot adjacent said viewing region.

10. The apparatus of claim 1, wherein said illumination means is mounted on a second support member, with said second support member being mounted to pivot adjacent said viewing region.

* * * * *